July 26, 1966  F. W. FORK  3,262,238
ELEVATED TILE-STOP MEMBER FOR ADJUSTABLE ELECTRICAL TRENCH
Filed Sept. 30, 1963  2 Sheets-Sheet 1
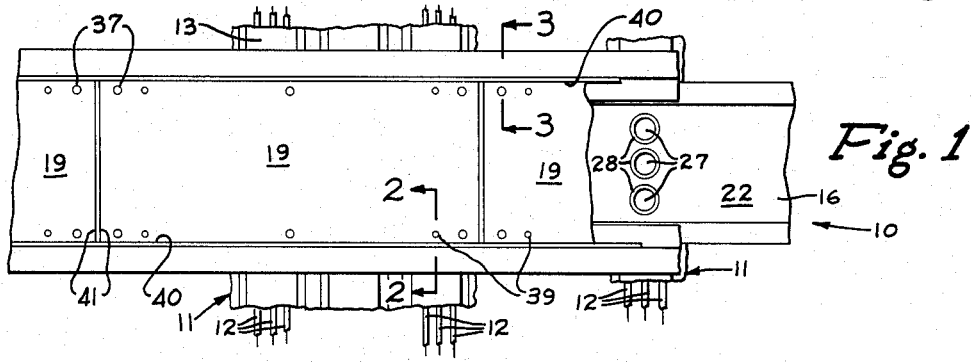
*Fig. 1*
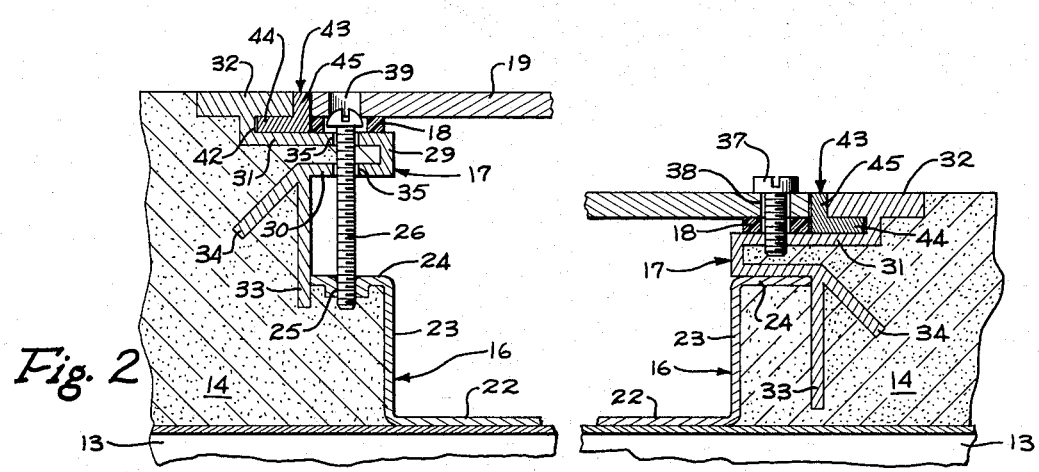
*Fig. 2*
*Fig. 3*
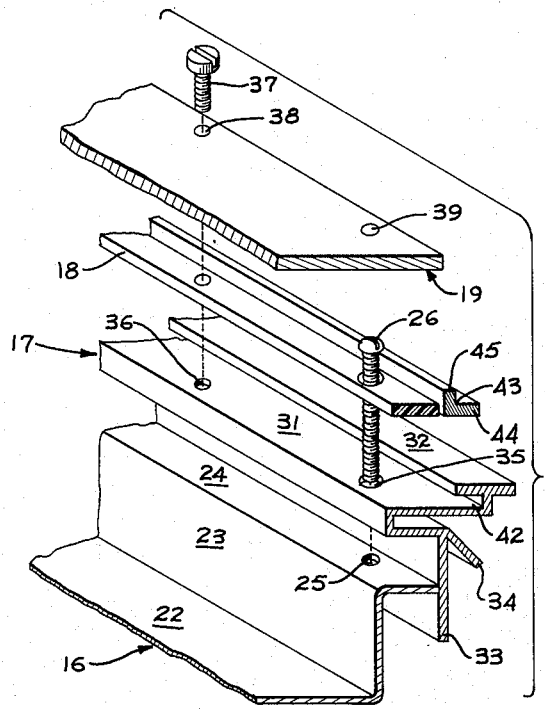
*Fig. 4*
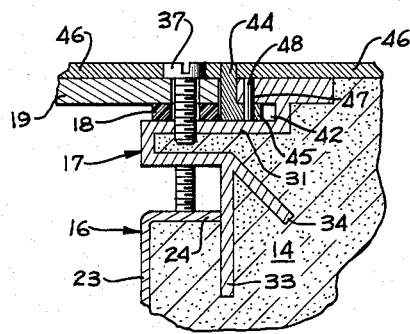
*Fig. 5*
INVENTOR.
FRANK W. FORK
BY
Harry B Keck
ATTORNEY July 26, 1966   F. W. FORK   3,262,238
ELEVATED TILE-STOP MEMBER FOR ADJUSTABLE ELECTRICAL TRENCH
Filed Sept. 30, 1963   2 Sheets-Sheet 2

INVENTOR.
FRANK W. FORK
BY
Harry B Keck
ATTORNEY

United States Patent Office 3,262,238
Patented July 26, 1966

3,262,238
ELEVATED TILE-STOP MEMBER FOR ADJUSTABLE ELECTRICAL TRENCH
Frank W. Fork, Allison Park, Pa., assignor to H. H. Robertson Company, Pittsburgh, Pa., a corporation of Pennsylvania
Filed Sept. 30, 1963, Ser. No. 312,708
10 Claims. (Cl. 52—221)

This invention relates to an electrical trench especially adapted for use in underfloor installations in a modern building. The present electrical trench is useful in combination with metal cellular flooring and also with reinforced concrete flooring installations.

The provision of underfloor electrical trenches in modern buildings has become standard construction. See U.S. Patent 3,084,480 and U.S. Patent 3,101,097.

The present electrical trench is similar to that described in my copending patent application S.N. 119,977, filed June 27, 1961, now Patent No. 3,237,356.

Electrical trenches

In general electrical trenches utilize an upright channel having a horizontal base and upright sides. Each of the sides has at its top a linear screed strip, usually extruded from aluminum of similar ductile metals. The linear screed strip is disposed laterally of the upper ends of each of the channel sides. A cover plate, usually fabricated from steel plate, is applied above the channel base and extending across the two linear screed strips. The cover plate is fastened to the linear screed strips. An adjustment means, usually vertically disposed adjustment screws, is provided for regulating the vertical distance between the cover plate and the channel base. The top surface of the cover plate and the top of the linear screed strips are coplanar and serve together as a screed which determines the level of a subsequently poured concrete floor covering layer. After the concrete has been poured and hardened, the cover plate is removed to expose the interior of the electrical trench. A tile-stop extrusion thereupon is installed between the cover plate and the linear screed strip (laterally of the cover plate) to serve as a permanent separator between a decorative floor-covering layer which is applied to the cover plates themselves and a corresponding decorative floor covering applied to the upper surface of the concrete layer. The described decorative floor covering customarily is asphalt tile, rubber tile, similar plastic tiles, linoleum sheets or tile, ceramic tile, wood flooring, carpeting and the like.

The present invention

The present invention provides an improved arrangement for the linear screed, strip and tile-stop member of an electrical trench. The present electrical trench is flush with the concrete screed prior to and during the pouring and hardening of the concrete floor covering layer; and after the hardening of the concrete layer, the tile-stop member is positioned to extend above the screed level by the thickness of the anticipated decorative floor covering material.

According to this invention, the tile-stop member is disposed entirely outside the coverplate whereby the cover plate does not bear against the tile-stop member. Accordingly the tile-stop member may be made of materials which do not normally present significant resistance to compressive stresses such as extrudable plastic substance, polycarbonates, polyamides, polypropylene and the like.

The present tile-stop member is secured to the trench assembly regardless of whether the cover plates are assembled or dismantled. Hence there is no relative movement between the tile-stop member and the decorative floor covering laterally of the cover plates.

In a preferred embodiment, the surfaces of the present tile-stop member which will ultimately engage the decorative floor covering and be visible in the completed assembly are totally enclosed throughout the construction period of the building and thus are protected against exposure to deleterious action of concrete, eliminating the need for on-site cleaning of the reversible tile-stop members.

In a further alternative embodiment of the invention, locking means are provided for securing the reversible tile-stop member in its alternate positions.

Statement of the invention

The electrical trench improvement of this invention utilizes a linear screed strip having a screed lip which extends above a supporting ledge whereon rests the edge portions of the bottom surface of the trench cover plate. The screed lip has an upper surface which is substantially coplanar with the upper surface of the cover plate whereby the screed lip and cover plate together serve as a screed level for wet concrete. The screed lip is laterally displaced from the cover plate sides and is spaced apart therefrom. A slot is provided in the linear screed strip beneath the screed lip for receiving a tongue of a tile stop member. The tile-stop member has a tile-stop extension which is elevated above the upper surface of the cover plate after the concrete has been poured around the electrical trench. The tile-stop extension fills the gap between the screed lip and the cover plate.

Objects

The principal object of this invention is to provide an improved electrical trench having cover plates, linear screed strips and, interposed therebetween a tile-stop extension which may be securely retained within the assembly even after the cover plates of the trench have been removed. The tile-stop member is not disposed beneath the cover plate and thereby is protected against exposure to compressive stresses.

Other objects and advantages of the invention will become apparent from the following detailed description by reference to the accompanying drawings in which:

FIGURE 1 is a plan view, partly broken away, of the present electrical trench;

FIGURE 2 is a cross-section view taken along the line 2—2 of FIGURE 1 and showing one half of the electrical trench in an elevated position;

FIGURE 3 is a cross-section view taken along the line 3—3 of FIGURE 1 and showing one half of the present electrical trench in a non-elevated position;

FIGURE 4 is an exploded view showing the assembly of various components of the present electrical trench;

FIGURE 5 is a fragmentary cross-section view similar to FIGURE 2 showing the present electrical trench with a tile-stop member reversed and a decorative floor covering applied above the trench and surrounding floor;

Figure 6:
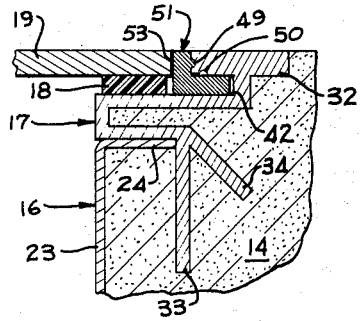
FIGURES 6 and 7 are cross-sectional views of an alternative embodiment of the present invention similar to FIGURE 3 and showing a reversible tile-stop member in a screed position (FIGURE 6) and in a tile-stop position (FIGURE 7)

The present electrical trench is illustrated in plan view in FIGURE 1. The trench is identified generally by the numeral 10. The trench is positioned, in a preferred environment, above metal cellular flooring sections 11 and serves to protect, enclose and distribute electrical conductors 12 into and out from the raceways 13 of the metal cellular flooring 11. The trench comprises essentially an upright channel 16, a pair of linear screed strips 17, a pair of gasketing members 18, and a cover plate 19. A layer of concrete 14 is provided above the metal cellular flooring 11, laterally of the electrical trench 10.

The upright channel 16 is preferably fabricated from sheet metal and includes a base 22, a pair of upright sides 23 and an outwardly extended generally horizontal flange 24. A plurality of spaced threaded openings 25 is provided along the flange 24 to receive vertical adjustment screws 26 in threaded engagement. The channels 16 normally are provided in modular lengths up to about twelve feet. Abutting modular lengths of the trench channel 16 are aligned to provide a lengthwise continuation of the present electrical trench. A plurality of openings 27 may be cut through the base 22 and through the underlying raceway 13 to provide communication from the interior of the electrical trench 10 to the interior of the electrical raceway 13 of the metal cellular flooring 11. Customarily soft metal of plastic grommets 28 will be provided along the rim of the openings 27 to prevent sharp metal edges from cutting electrical conductors extended therethrough. The present electrical trench also has utility in reinforced concrete buildings which do not incorporate metal cellular flooring.

The linear screed strips 17 preferably are extruded from a ductile metal such as aluminum. The linear screed strips have a vertical web 29, a lower horizontal leg 30, an upper horizontal leg 31 (also referred to as a supporting ledge), a screed lip 32 and a depending vertical flange 33. Optionally an outwardly extended concrete anchor flange 34 may be provided as an outward extension from the depending vertical flange 33.

The upper leg 31 and lower leg 30 of the linear screed strip 17 have spaced, aligned clearance holes 35 for receiving the vertical adjustment screws 26. The upper leg 31 (also called supporting ledge) has, in addition, threaded openings 36 for receiving hold-down screws 37 in threaded engagement. The threaded hold-down screws 37 pass through clearance holes 38 in the cover plate 19. The cap of the hold-down screws 37 is larger in diameter than the clearance holes 38.

The vertical adjustment screws 26 have a head which is slotted to receive a turning implement such as a screwdriver tip. The head of the vertical adjustment screw 26 is secured between the bottom surface of the cover plate 19 and the upper horizontal leg 31. An access opening 39 is provided through the cover plate 19 to permit entry of a screw-head turning implement such as a screw-driver tip. The vertical adjustment screw 26 thus can be turned relative to its threaded engagement with the threaded opening 25 by means of a suitable implement inserted through the access opening 39.

The cover plates 19 are provided in lengths which generally are less than the length of an individual section of the trench 10. Hence, more than one cover plate 19 appears in each modular trench section. The cover plates have lateral edges 40 and abutting end edges 41 as seen in FIGURE 1. It will be observed that the lateral edges 40 are spaced apart from the inner edge of the screed lip 32. One or more of the cover plates 19 can be removed separately from the remaining cover plates.

The linear screed strip 17 also includes a slot 42 which is disposed beneath the screed lip 32 and at least in part, above the upper leg 31. The slot 42 provides a protected recess for receiving a generally L-shaped tile stop member 43 having a tile-stop extension 44 and a tongue 45 angularly disposed thereto. In FIGURES 2 and 3, the tile-stop member 43 has its tile stop extension 44 disposed within the slot 42 and tongue 45 is disposed in the space between the screed lip 32 and the lateral edge 40 of the cover plate 19.

It will be further observed that the extreme surface of the tongue 45 is substantially coplanar with the upper surface of the cover plate 19 and the screed lip 32. When the hold-down screws 37 are threadedly engaged in the threaded openings 36, the present trench components constitute a unitary structure having a flush screed level. By adjustment of the vertical adjustment screws 26 through the access holes 39, the cover plates 19 can be leveled despite sag and irregularities of the channel 16. Frequently the actual pouring of concrete 14 creates added sag in a building floor construction. With the present electrical trench, added vertical adjustments can be carried out after wet concrete has been poured and before the hardening process has rigidized the floor assembly.

After the concrete floor covering 14 has hardened, the cover plates 19 are removed by withdrawing the hold-down screws 37. The electrical trench is then filled with electrical cables and conductors as needed. While the cover plates 19 are thus removed, the tile-stop member 43 is withdrawn from the slot 42 and reversed to the position shown in FIGURE 5. There the tongue 45 is disposed within the slot 42 and the tile-stop extension 44 is upwardly presented with its extreme surface being disposed above the top surface of the cover plate 19 and above the top surface of the screed lip 32. The elevation of the extreme surface corresponds with the thickness of a decorative floor covering 46 which is thereafter applied to the concrete floor layer 14 and also to the cover plates 19. The tile-stop member 43 remains permanently in position regardless of whether the cover plates thereafter are removed or are in place.

If desired, a bore 47 may be drilled through the inner edge of the screed lip 32 (above the slot 42) and into the tongue 45. A pin 48 may be inserted into the bore 47 (see FIGURE 5) to lock the tile-stop member 43 mechanically.

Figure 7:
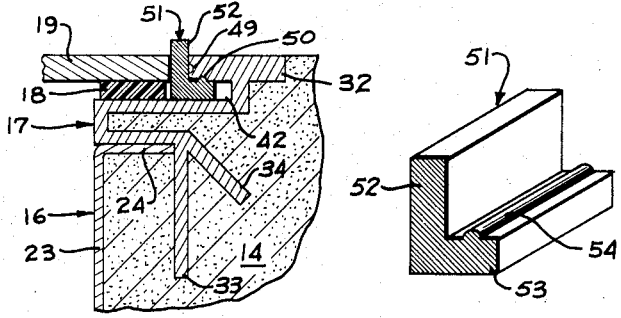
Figure 8:
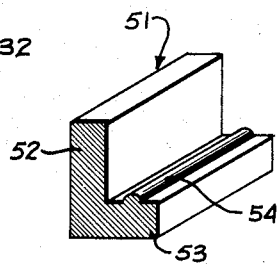
FIGURE 8 is a fragmentary perspective illustration of the tile-stop member of FIGURES 6 and 7.

An alternative embodiment is illustrated in FIGURES 6, 7 and 8 wherein corresponding numerals identify corresponding elements. The screed lip 32 is provided with a pair of lengthwise grooves 49, 50. The groove 49 appears in the inner vertical surface of the screed lip 32 and the groove 50 appears in the top surface of the slot 42. A tile-stop member 51 (FIGURE 8) has a tile-stop extension 52 and a tongue 53. A bead 54 is provided on the interior angle surface of the tongue 53. The bead 54 is recessed within the groove 49 (FIGURE 6) when the tile-stop member 51 is in the level-screed arrangement. The tile stop member 51 readily separates from the linear screed strip 17 from this position upon withdrawal of the cover plates 19. However when the tile-stop member 51 is reversed into the elevated arrangement (FIGURE 7), the tongue 53 enters the slot 42 and the bead 54 snaps into the groove 50 to retain the tile-stop member 51 rigidly. The bead 54 obviously may be continuous as shown in FIGURE 8 or may be discontinuous, i.e., a series of aligned bumps or similar protuberances.

Figure 10:
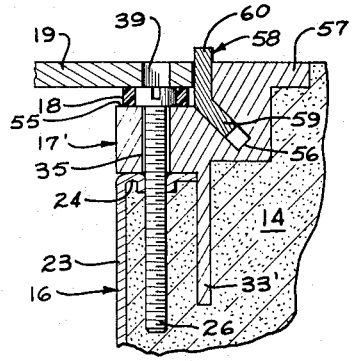
FIGURES 9 and 10 are cross-section views similar to FIGURE 2 of a further alternative embodiment of the invention showing a reversible tile stop member in a screed position (FIGURE 9) and in a tile-stop position (FIGURE 10)
Figure 9:
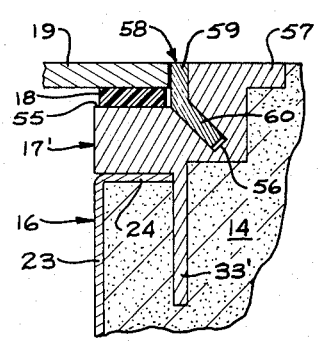
Figure 11:
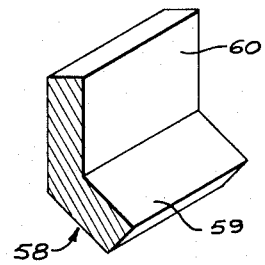
FIGURE 11 is a fragmentary perspective view of the tile-stop member shown in FIGURES 9 and 10.

A further alternative embodiment of this invention appears in FIGURES 9, 10, 11 wherein the linear screed strip 17' has a supporting ledge 55 and a descending slot 56 beneath a screed lip 57 and in part above the supporting ledge 55. The slot 56 declines outwardly at a predetermined angle to terminate beneath the supporting ledge 55. An angular tile-stop member 58 (FIGURE 11) has a tile stop extension 59 and a tongue 60 which is disposed at the predetermined angle. The tile-stop extension 59 is disposed within the slot 56 during the level screed arranged (FIGURE 9) with the tongue 60 being vertically upwardly presented to fill the space between the cover plate 19 and the screed lip 57. In the alternate arrangement, the tile-stop member 58 is reversed and the tongue 60 is engaged within the descending slot 56 with the tile-stop extension 59 being vertically upwardly presented and being elevated above the level of the cover plate 19 and the screed lip 57 to accommodate decorative floor coverings.

Figure 12:
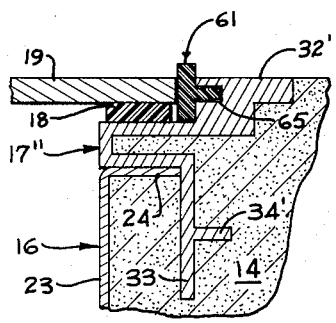
FIGURE 12 is a cross-section view similar to FIGURE 2 showing a further alternative embodiment of the present invention wherein a tile-stop member is extruded from thermoplastic materials and is not reversible.
Figure 13:
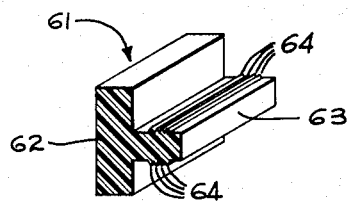
FIGURE 13 is a fragmentary perspective view of the tile-stop member of FIGURE 12.

A further embodiment of this invention is illustrated in FIGURES 12 and 13 wherein the tile-stop member has only one possible arrangement within the trench assembly, i.e., in the tile-stop-elevated arrangement. An extruded plastic tile-stop member 61 of FIGURE 13 includes the tile stop extension 62 and a tongue 63, integral therewith and having over its opposed surfaces a plurality of beads 64 of the plastic substance which are readily distortable to allow the tongue 63 to enter a slot 65 within the linear screed strip 17''.

The tile-stop member 61 is not installed into the trench assembly until after the concrete floor layer has been poured. Prior to installation of the tile-stop member 61, a temporary inexpensive strip of disposable material (such as pressed paper, fiberboard, inexpensive plastic extruded strips, et cetera) is wedged between the cover plate 19 and the screed lip 32'. The color of the plastic tile-stop member 61 may be altered to correspond with the coloring of the decorative floor covering.

Advantages

The present electrical trench provides a rigidly anchored tile-stop member; loose reversible tile-stop members have exhibited a tendency to chip away the decorative floor tile as the cover plates are removed from time-to-time. With the present trench, the tile-stop member is fixed relative to the decorative floor covering laterally of the cover plate.

Since the present tile-stop member is not compressed beneath the cover plates, its fabrication from plastic materials becomes feasible.

With the reversible tile-stop member of FIGURES 2 through 11 inclusive, the deleterious action of wet concrete is avoided by protecting all surfaces of the reversible tile-stop member which will ultimately engage the decorative floor covering. Those surfaces are enclosed within the slot and thus protected during the concrete pouring operations. As a result there is no need for on-site cleaning of the tile-stop member prior to reversal.

I claim:
1. In an underfloor electrical trench having in combination:
   an upright channel having a base and upright sides;
   a linear screed strip extended along each of the said upright sides and having a horizontally disposed, upwardly-presented supporting ledge;
   a cover plate disposed above the said base and having lateral edge portions of its bottom surface disposed above the said supporting ledge and secured thereto; and
   adjusting means for setting the vertical distance between the said cover plate and the said base;
   whereby the said channel, linear screed strips and cover plate comprise a continuous enclosure for the interior of the said trench;
   the improvement comprising:
   a screed lip which is integral with the said linear screed strip and which is disposed laterally of and above the said supporting ledge, said screed lip having an upper surface which is substantially coplanar with the upper surface of the said cover plate;
   the said screed lip being spaced apart from the adjacent side edge of the said cover plate;
   a lengthwise slot in the said linear screed strip located beneath the upper surface of the said screed lip and located at least in part above the said supporting ledge;
   a tile-stop member comprising a tile-stop extension and a tongue disposed angularly thereto, the said tongue being disposed within the said slot and the said tile-stop extension being disposed between the said screed lip and the said cover plate with the extremity of the said tile-stop extension being elevated above the said screed lip and the upper surface of the said cover plate.

2. The improvement of claim 1 wherein the said tile-stop member is reversible whereby in one arrangement, the said tile-stop extension is received within the said slot and the said tongue is disposed between the said screed lip and the said cover plate with the upper edge of the said tongue being substantially coplanar with the upper surface of the said cover plate; and in the alternate arrangement, the said tile-stop extension and the said tongue are interchanged with the said tongue being received within the said slot and the said tile-stop extension being disposed between the said cover plate and the said screed lip with the extremity of the said tile stop extension being elevated above the level of the upper surface of the said cover plate.

3. The improvement of claim 1 wherein the said slot comprises a horizontal groove disposed entirely beneath the said screed lip and disposed entirely above the said supporting ledge with the upper surface of the said supporting ledge being coextensive with the bottom surface of the said slot.

4. The improvement of claim 1 wherein the said tile-stop member is generally L-shaped with one portion thereof comprising the said tile-stop extension and being longer than the other portion which comprises the said tongue.

5. The improvement of claim 2 wherein the said slot has a continuing groove in one of its side wall surfaces and the said tile-stop member has corresponding protuberances extended from the said tongue thereof, whereby the said protuberances correspond with the said groove to permit the said tile-stop member to be snapped into a position of correspondence with the slot in which the said protuberances register with the said groove.

6. The improvement of claim 5 wherein the said protuberances comprises a continuous bead on the said tongue.

7. The improvement of claim 2 wherein the said extremity of the said tile-stop extension is entirely enclosed within the said slot in one arrangement of the said separator strip.

8. The improvement of claim 1 wherein at least one passageway is provided entirely through the said screed lip and a corresponding passageway is provided through the said tongue,
   a pin extended through the passageway of the said screed lip and also through the passageway of the said tongue whereby the said tongue is retained within the said slot.

9. The improvement of claim 2 wherein the said slot opens above the said supporting ledge and declines outwardly at a predetermined angle to terminate beneath the said supporting ledge,
   the said tile-stop member having its tongue disposed at the said predetermined angle relative to the tile-stop extension thereof, whereby the said tile-stop member may assume alternate arrangements wherein (a) the tongue is disposed within the said slot and the said tile-stop extension is vertically upwardly presented;

and (b) the tile-stop extension is disposed within the said slot and the said tongue is vertically upwardly presented.

10. The improvement of claim 1 wherein the said tile-stop member is fabricated from a thermoplastic substance and has a plurality of distortable beads of the said thermoplastic substance disposed on opposed surfaces of the said tongue whereby the said tongue may be resiliently retained within the said slot through distortion of the said beads.

References Cited by the Examiner
UNITED STATES PATENTS

| 3,061,663 | 10/1962 | Reiland | 52—221 X |
| 3,074,208 | 1/1963 | Seidel | 52—221 |
| 3,101,097 | 8/1963 | Murray | 52—220 X |
| 3,166,633 | 1/1965 | Guzan, et al. | 52—220 X |

FRANK L. ABBOTT, *Primary Examiner.*